Dec. 20, 1955  J. D. HUME  2,727,755
STABILIZER LEVER FOR TRACTOR SEMI-TRAILER
FIFTH-WHEEL HITCHES
Filed April 24, 1953  4 Sheets-Sheet 1

INVENTOR.
James D. Hume
BY
Atty.

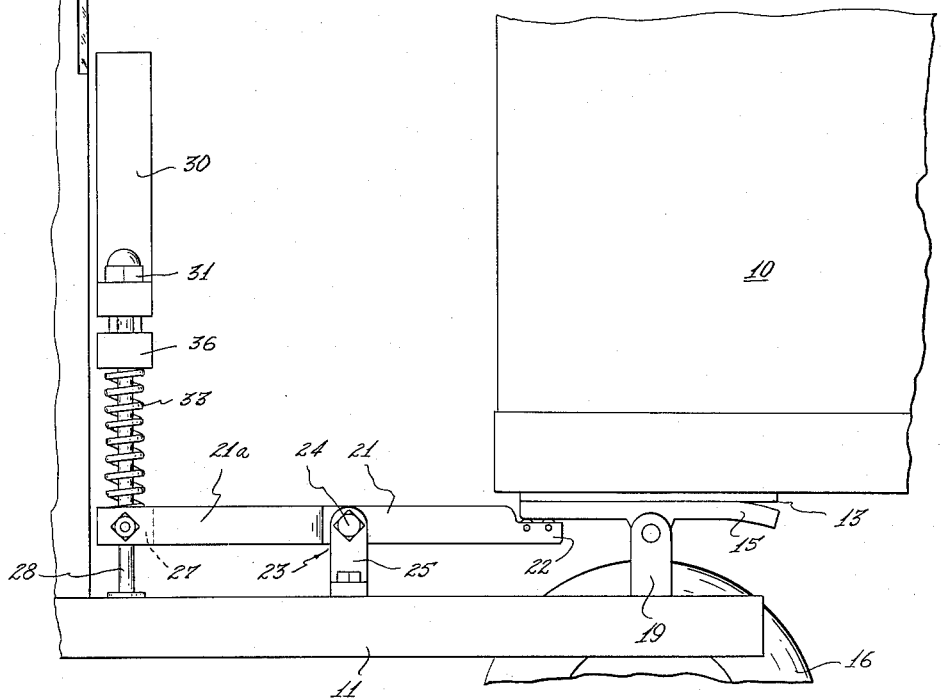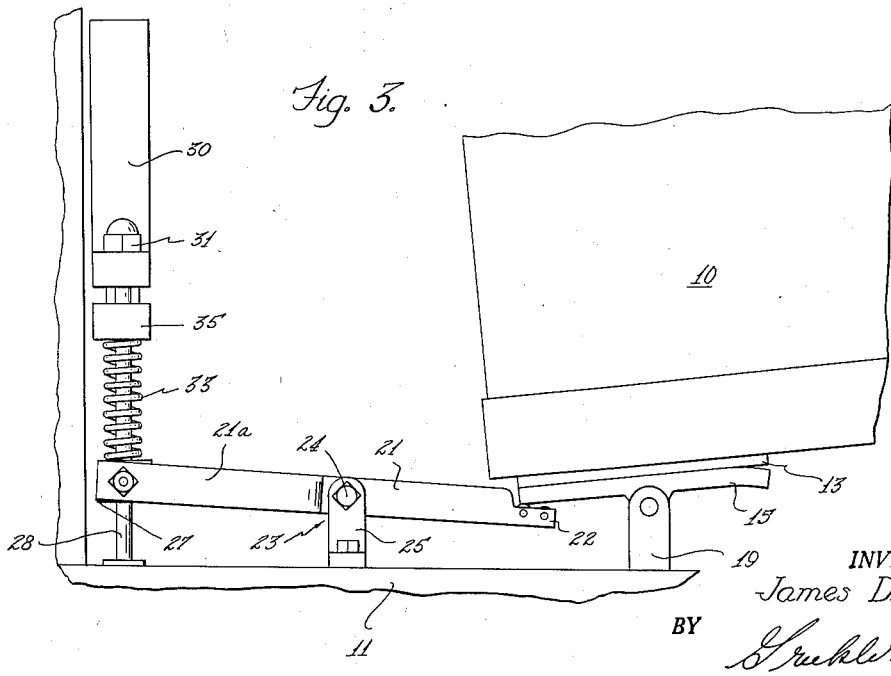

Dec. 20, 1955 — J. D. HUME — 2,727,755
STABILIZER LEVER FOR TRACTOR SEMI-TRAILER FIFTH-WHEEL HITCHES
Filed April 24, 1953 — 4 Sheets-Sheet 3

INVENTOR.
James D. Hume
BY Seek Wells
Atty

Dec. 20, 1955 J. D. HUME 2,727,755
STABILIZER LEVER FOR TRACTOR SEMI-TRAILER
FIFTH-WHEEL HITCHES
Filed April 24, 1953 4 Sheets-Sheet 4

INVENTOR.
James D. Hume
BY
Gruhlwell
Atty.

United States Patent Office 2,727,755
Patented Dec. 20, 1955

2,727,755

STABILIZER LEVER FOR TRACTOR SEMI-
TRAILER FIFTH-WHEEL HITCHES

James D. Hume, Mendota, Ill.

Application April 24, 1953, Serial No. 350,895

5 Claims. (Cl. 280—405)

My present invention relates to improvements in a Trailer Hitch. It is the principal purpose of my invention to provide a stabilizing hitch for heavy trailers that are provided with rear wheel units, the front end of the trailer being carried on a fifth wheel structure of a power truck. In this type of transporting device the problem of maintaining an adequate balance of load on the power truck wheels is a difficult one. The drag of the trailer rearwardly tends to lift the front of the power truck and deprive the truck of sufficient weight at the front end for steering purposes. The fifth wheel must take all of the bumps of uneven road. According to my invention I provide on the power truck a stabilizer lever which has one end held down by the fifth wheel forwardly of its pivot on the truck. This stabilizer lever is supported on the truck in front of the fifth wheel and extends forwardly from its support to a spring counter balance unit which is adjustable to apply more or less spring pressure to the stabilizer lever.

The advantage of this novel construction is that it transfers a substantial portion of the downward pressure of the front end of the trailer from the fifth wheel forward to a point intermediate the front and rear wheels of the truck, and, it maintains the downward pressure on the truck at the forward point even though the truck and trailer may be going over uneven roads that will rock the front end of the truck or the rear end of the trailer up and down with respect to the fiifth wheel connection.

The nature and advantages of my invention will appear more fully from the following description and the accompanying drawings wherein a preferred form of the invention is illustrated. The drawings and description are intended to be illustrative only and are not intended to limit the invention except insofar as it is limited by the claims.

In the drawings:

Figures 2 and 3 are enlarged fragmentary side views showing the coupling between the truck and trailer which embodies my invention;

Figure 1:
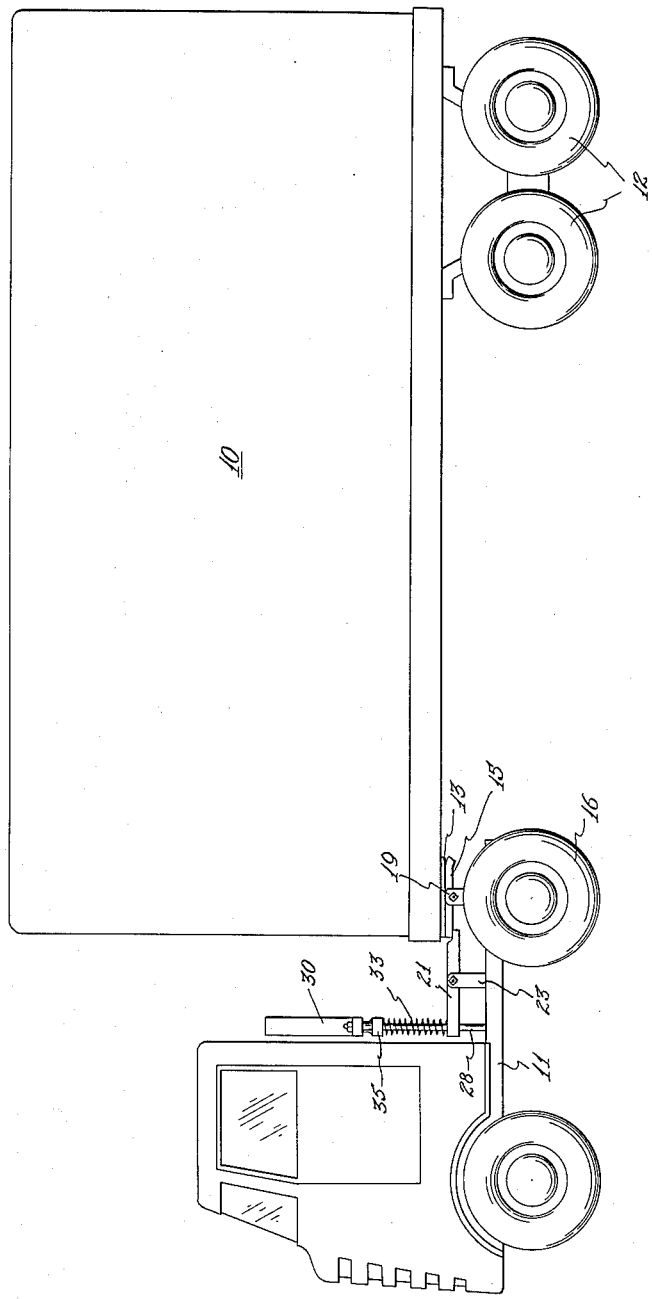
Figure 1 is a view in side elevation of a truck and trailer unit embodying my invention.
Figure 4:
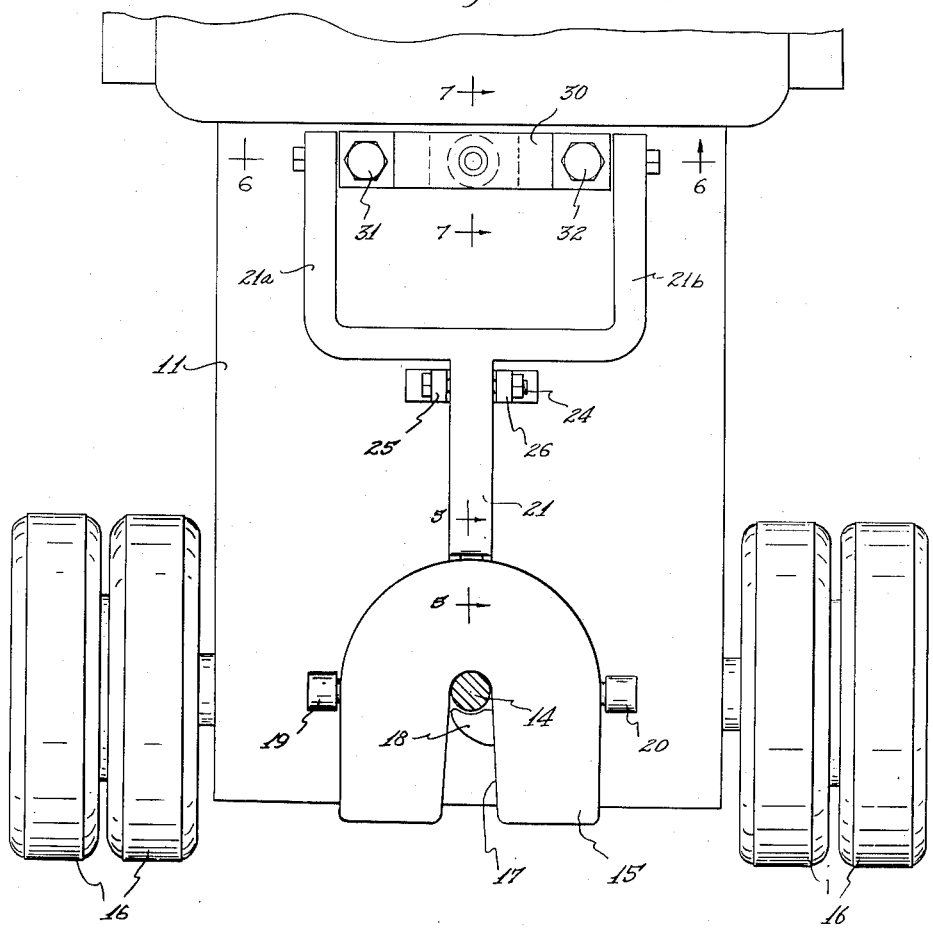
Figure 4 is a plan view looking down on the rear end of the truck with the trailer broken away.
Figure 5:
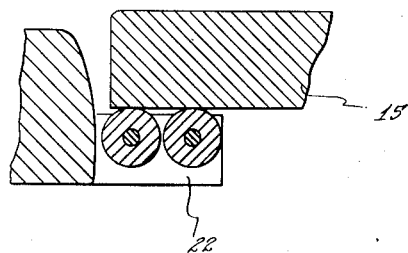
Figure 5 is an enlarged fragmentary sectional view taken on the line 5—5 of Figure 4.

Referring now in detail to the drawings and particular to Figure 1, my invention is embodied in a coupling between a trailer 10 and a truck 11 where the trailer 10 is of the type having its rear end supported by wheels 12 and its front end provided with a bearing member 13 and a king pin 14 that are supported upon and coupled to a fifth wheel 15 that is mounted on the rear end of the truck 11. Usually the trucks 11 are provided with heavy duty engines which are connected to the wheels 16 of the truck to furnish the motive power for the vehicle combination. The fifth wheel member 15 is slotted at 17 to receive the king pin 14 and has a securing latch 18 that holds the king pin in place. The member 15 is pivoted in bearings 19 and 20 on the truck to permit it to rock about a transverse axis and accommodate road conditions which will raise or lower the front end of the truck or the rear end of the trailer with respect to the support at the fifth wheel.

The construction so far described is conventional in semi-trailer units. My invention is directed to providing means to exert a stabilizing control force from the fifth wheel connection to the truck itself so as to cause the front wheels of the truck to be urged downwardly with a force proportionate to the downward pressure of the front end of the trailer on the fifth wheel. To accomplish my purpose I provide a stabilizer lever 21, the rear end 22 of which extends under the forward end of the fifth wheel member 15. The lever 21 is pivoted intermediate its ends on a support 23 that is provided on the truck 11. The support embodies a pivot pin 24 and two upstanding brackets 25 and 26 that support the pivot pin 24.

The lever 21 is divided in front of the support 23 to provide two lever arms 21a and 21b. The lever arms 21a and 21b are pivoted to a cross bar 27 that is mounted for vertical sliding movement on two posts 28 and 29 that are mounted on the truck 11. The posts 28 and 29 are connected at their top ends by a yoke 30. Cap screws 31 and 32 are threaded on the posts 28 and 29 to hold the yoke 30. Compression springs 33 and 34 are seated on the cross bar 27. These springs 33 and 34 support a second cross bar 35 which is connected to the yoke 30. The connection between the cross bar 35 and the yoke 30 is an extensible one. A threaded member 36 is pivoted to the cross bar 35 by a pivot pin 37. A member 38 is secured to the top of the yoke 30. The members 36 and 38 have opposed threads, that is, right and left hand. A sleeve 39 is threaded to receive the members 36 and 38 to provide a turn buckle to raise and lower the cross bar 35 with respect to the yoke 30.

Figure 6:
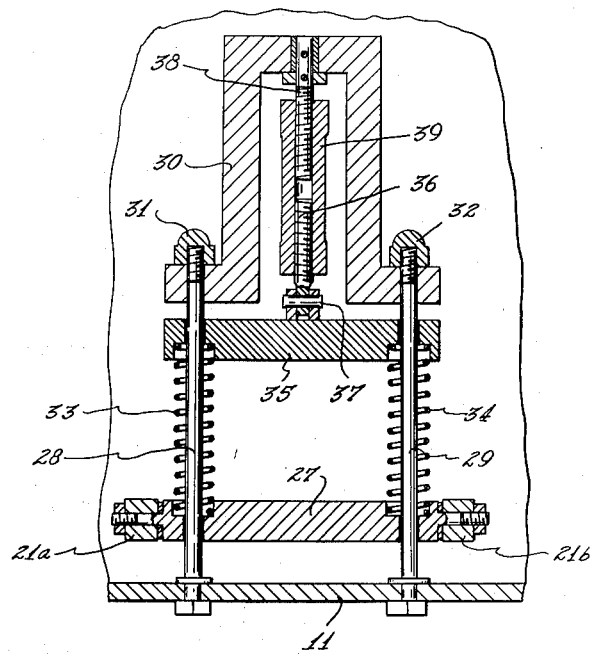
Figure 6 is a sectional view taken on the line 6—6 of Figure 4.
Figure 7:
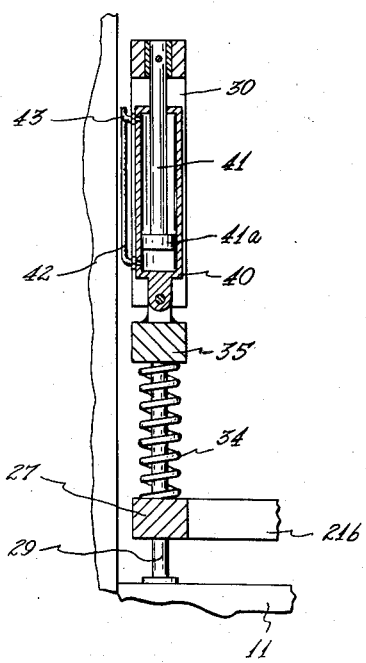
Figure 7 is a sectional view taken substantially on the line 7—7 of Figure 4, but illustrating a modified form of the invention.

The yoke 30 and the cross bar 35 may be adjusted with respect to each other in other ways. For example, where it is desired to have the adjustment always under control of the driver of the truck, the turn buckle arrangement shown in Figure 6 is replaced by an hydraulic mechanism shown in Figure 7. In this figure, the yoke 30 and the cross bar 35 are connected by a cylinder 40 which is supported on the cross bar 35 and a piston rod 41 that is supported on the yoke 30. Hydraulic fluid connections 42 and 43 are provided for supplying fluid under pressure to the opposite sides of the piston 41a on the rod 41. The hydraulic fluid supply can be operated by the driver of the truck to move the cross bar 35 up or down to vary the pressure of the springs 33 and 34 on the cross bar 27.

The operation of my improved trailer hitch is quite simple. Assuming that the trailer 10 is loaded and coupled to the truck 11, the driver then adjusts the cross bar 35 up or down until the stabilizer lever 21 is actually carrying the desired amount of weight of the front end of the trailer. When the trailer is heavily loaded, the cross bar 35 will be moved downward more than when the trailer is lightly loaded in order to provide a greater counter balancing force through the lever 21. The lever 21 rocks up and down in response to any rise and fall of the supporting wheels 16 with respect to the rear end of the trailer or the front end of the truck. In this way the lever 21 always transmits a certain amount of the trailer load through the support 23 to a point on the truck body some distance in front of the rear wheels of the truck to offset the tendency of the trailer to lift the front end of the truck. The bearing of the king pin 14 against the latch 18 is behind the bearings 19 and 20 so that the rear portion of the fifth wheel plate 15 is held up against the bearing plate 13 on the trailer by the drag of the trailer. The connection of the fifth wheel 15 to the trailer 10 is, however, always above the axle of the rear wheels 16 of the truck 11. The drag of the trailer therefore tends to lift the front end of the truck. When the trailer wheels strike a bump, there is a sudden jerk that may lift the front end of the truck 11 and deprive the operator of any guiding control of the vehicle because there is not enough weight on the front wheels of the truck to enable them to turn the truck. My stabilizer mechanism provides a yielding force to offset the jerk and to urge the front end of the truck down.

The stabilizer mechanism operates, when the wheels 16 drop lower than the front truck wheels and the trailer wheels, to transfer a greater part of the load to the front truck wheels and the trailer wheels by compressing the springs 33 and 34. This is illustrated by comparison of Figures 2 and 3. In Figure 3 the front end of the trailer 10 has forced the rear end of the lever 21 down to put a greater part of the load on the support 23 of the lever 21.

It is believed that the nature and advantages of my invention will be apparent from the foregoing description. It provides a yielding mechanism between the trailer and truck that opposes the tendency of the trailer to bounce the front end of the truck up and down and gives the operator better control and better riding conditions.

Having thus described my invention, I claim:

1. In a semi-trailer wherein a trailing vehicle has rear supporting wheels and the front end of the trailing vehicle is supported upon a fifth wheel unit mounted on the rear end of a power driven vehicle, said fifth wheel unit being mounted on a transverse axle supported on the powered vehicle, a stabilizer lever extending forwardly from the fifth wheel and having its rear end positioned beneath the fifth wheel at a point spaced longitudinally from the transverse axle to press upwardly on the fifth wheel, a support for said lever mounted on the powered vehicle forwardly of the fifth wheel, means pivotally mounting the lever on said support, and adjustable means on the powered vehicle connected to said lever operable to hold the lever in a position to cause the rear end thereof to press upwardly on the fifth wheel, said adjustable means including spring means under compression, opposing downward movement of the rear end of the lever.

2. In a semi-trailer wherein a trailing vehicle has rear supporting wheels and the front end of the trailing vehicle is supported upon a fifth wheel unit mounted on the rear end of a power driven vehicle, said fifth wheel unit being mounted on a transverse axle supported on the powered vehicle, a stabilizer lever extending forwardly from the fifth wheel and having its rear end positioned beneath the fifth wheel at a point spaced longitudinally from the transverse axle to press upwardly on the fifth wheel, a support for said lever mounted on the powered vehicle forwardly of the fifth wheel, means pivotally mounting the lever on said support, said lever having a portion extending forwardly from said support, and spring means mounted on the powered vehicle and connected to said forwardly extended portion at its front end to urge the forwardly extended portion downward.

3. In a semi-trailer wherein a trailing vehicle has rear supporting wheels and the front end of the trailing vehicle is supported upon a fifth wheel unit mounted on the rear end of a power driven vehicle, said fifth wheel unit being mounted on a transverse axle supported on the powered vehicle, a stabilizer lever extending forwardly from the fifth wheel and having its rear end positioned beneath the fifth wheel at a point spaced longitudinally from the transverse axle to press upwardly on the fifth wheel, a support for said lever mounted on the powered vehicle forwardly of the fifth wheel, means pivotally mounting the lever on said support, said lever having a portion extending forwardly from said support, spring means supported on said forwardly extending portion, a bar resting on said spring means, upright guide means on the vehicle for guiding the bar up and down, and means mounted on said guide means for forcing the bar downward.

4. In a semi-trailer wherein a trailing vehicle has rear supporting wheels and the front end of the trailing vehicle is supported upon a fifth wheel unit mounted on the rear end of a power driven vehicle, a stabilizer lever extending forwardly from the fifth wheel and having its rear end positioned beneath the fifth wheel to press upwardly on the fifth wheel, a support for said lever mounted on the powered vehicle forwardly of the fifth wheel, means pivotally mounting the lever on said support, a cross bar spaced forwardly from the support, upright guides on the powered vehicle for said cross bar, said lever having two arms pivotally secured to the cross bar and supporting it, a second cross bar on said guides above the first named cross bar, coiled springs interposed between said cross bars, a yoke on said guides, and means on the yoke to move the second cross bar down against the springs.

5. In a semi-trailer wherein a trailing vehicle has rear supporting wheels and the front end of the trailing vehicle is supported upon a fifth wheel unit mounted on the rear end of a power driven vehicle, a stabilizer lever extending forwardly from the fifth wheel and having its rear end positioned beneath the fifth wheel to press upwardly on the fifth wheel, a support for said lever mounted on the powered vehicle forwardly of the fifth wheel, means pivotally mounting the lever on said support, a cross bar spaced forwardly from the support, upright guides on the powered vehicle for said cross bar, said lever having two arms pivotally secured to the cross bar and supporting it, a second cross bar on said guides above the first named cross bar, coiled springs interposed between said cross bars, a yoke on said guides, and a jack interposed between the yoke and the second cross bar to move the second cross bar down against the force of the springs.

References Cited in the file of this patent

UNITED STATES PATENTS

| 1,267,561 | Lapham | May 28, 1918 |
| 1,737,724 | Lee | Dec. 3, 1929 |
| 2,391,372 | Weigand | Dec. 18, 1945 |
| 2,612,381 | Johnson | Sept. 30, 1952 |

FOREIGN PATENTS

| 317,224 | Great Britain | Aug. 15, 1929 |